United States Patent [19]
Violland et al.

[11] 4,068,035
[45] Jan. 10, 1978

[54] HYDROPHILIC POLYURETHANES AND TEXTILES TREATED THEREWITH

[75] Inventors: Robert Violland, Lyon; Alain Lagasse, Villeurbanne; Bernard Papillon, La Mulatiere; Jean Neel, Lyon; Maurice Coudurier, Meyzieu, all of France

[73] Assignee: Rhone-Poulenc Industries, Paris, France

[21] Appl. No.: 678,650

[22] Filed: Apr. 20, 1976

[30] Foreign Application Priority Data
Apr. 23, 1975  France ................. 75.13487

[51] Int. Cl.² ............ B32B 27/40; C11D 3/37; C08L 75/12; C08G 18/65
[52] U.S. Cl. .................. 428/279; 252/97; 252/528; 252/547; 252/DIG. 15; 260/29.2 TN; 260/77.5 AQ; 428/272; 428/341; 428/425
[58] Field of Search .............. 260/77.5 AQ, 29.2 TN; 8/DIG. 11, 192; 252/547, 97, 528, DIG. 15; 428/425, 279, 341, 272

[56] References Cited
U.S. PATENT DOCUMENTS

| 3,388,087 | 6/1968 | Dieterich et al. | 260/29.2 TN |
|---|---|---|---|
| 3,503,915 | 3/1970 | Peterson | 260/29.2 TN |
| 3,684,758 | 8/1972 | Honig et al. | 260/29.2 TN |
| 3,781,238 | 12/1973 | Helim | 260/29.2 TN |
| 3,873,484 | 3/1975 | Bluestein et al. | 260/77.5 AQ |
| 3,981,913 | 9/1976 | Markiewitz | 260/77.5 AQ |

*Primary Examiner*—H.S. Cockeram
*Attorney, Agent, or Firm*—Bacon & Thomas

[57] ABSTRACT

A hydrophilic polyurethane composition comprising a reaction product of:
1. 10 to 45 weight percent of an organic diisocyanate and,
2. 35 to 89 weight percent of a compound containing one or two active hydrogen atoms selected from:
   a. 75 to 100 weight percent of a compound of the general formula:

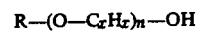

wherein
   R is hydrogen or a hydrocarbon radical containing from 1 to 20 carbon atoms;
   $x$ is a number from 2 to 4;
   $n$ is a number to indicate that the molecular weight is between 300 and 10,000; and,
   b. 0 to 25 weight percent of a diol and,
3. 1 to 25 weight percent of a nitrogen-containing compound of the general formula:

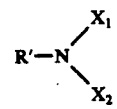

wherein
R' is an alkyl radical containing from 1 to 5 carbon atoms;
$X_1$ and $X_2$ are hydroxyalkyl or amino alkyl radicals with the proviso that the overall ratio of NCO-/active H is from about 0.7 to about 1. The composition when applied to textiles provides outstanding soil-release and anti-soil redeposition properties particularly with fibers and fabrics made of polyester and polyester blends.

23 Claims, No Drawings

HYDROPHILIC POLYURETHANES AND TEXTILES TREATED THEREWITH

BACKGROUND OF THE INVENTION

1. Field of the Invention

This invention relates to novel textile treating compositions. More particularly, this invention relates to textile treating compositions comprising a new hydrophilic polyurethane. This invention further relates to a process of treating textile materials to improve the stain release and anti-soil redeposition especially of textile articles containing polyester fibers.

2. Description of the Prior Art

It is in fact known that fabrics containing a significant proportion of polyester fibers have a tendency to be hydrophobic and oleophilic. These characteristics enable greasy stains deposited on the fabric to become fixed thereto, which makes them difficult to remove. Another well-known-disadvantage of polyester fibers is that during laundering the soil present in the wash liquor can re-deposit on the fabric. One of the means of dealing with the redeposition phenomenon and of facilitating the removal of greasy stains is to deposit on the fiber a finish which imparts to them some hydrophilic character. Therefore, while the oleophilic characteristics of the fiber permit oil and grime to be readily embedded therein, the hydrophilic properties of the fiber prevent water from entering the fiber to remove contaminants therefrom. Attempts have been made to reduce the oleophilic characteristics of these synthetic fibers by coating the fibers with a coating that is oleophobic, i.e., will hinder the attachment of soil or oily materials to the fibers. Many polymer systems have been proposed which are capable of forming a film around the fibers that constitute the textile material, particularly acid emulsion polymers prepared from organic acids having reactive points of unsaturation. These treating polymers are known as soil-release agents.

The term "soil-release" in accordance with the present invention refers to the ability of the fabric to be washed or otherwise treated to remove soil and/or oily materials that have come into contact with the fabric. The present invention does not wholly prevent the attachment of soil or oily materials to the fabric, but hinders such attachment and renders the heretofore uncleanable fabric now susceptible to a successful cleaning operation. While the theory of operation is still somewhat of a mystery, soiled, treated fabric when immersed in detergent-containing wash water experiences an agglomeration of oil at the surface. These globules of oil are then removed from the fabric and rise to the surface of the wash water. This phenomenon takes place in the home washer during continued agitation, but the same effect has been observed even under static conditions. In other words, a strip of polyester/cotton fabric treated with a dilute solution of the composition of the present invention and soiled with crude oil, when simply immersed in a detergent solution will lose the oil even without agitation.

Concentrated solutions of soil-release polymers have been padded onto fabrics by textile manufacturers to impart a permanent soil-release finish to the fabric. As the amount of soil-release polymer on the fabric is increased, the ability of the fabric to release soil is increased. However, fabrics with this permanent soil-release finish possess many disadvantages. As the amount of soil-release polymer on the fabric is increased the fabric has a tendency to become stiffer and lose the desirable hand characteristic of the fabric. Thus, the upper limit on the amount of soil-release polymer to be used is determined by economics and the resulting adverse effect on the fabric. Fabrics with a heavy application of soil-release polymer do not have the same desirable appearance and hand as the same fabrics without the soil-release coating. Furthermore, practically speaking, there is a set range of soil-release agent that can be applied, dictated by commercial success.

Some soil-release polymers are effective fabric treating agents even at very low levels on the fabric, at which levels the appearance and hand of the fabric are not adversely affected. Thus, an ideal method of treating a synthetic fiber containing fabric would be to reapply a very small amount of soil-release polymer to the fabric each time the fabric is washed.

SUMMARY OF THE INVENTION

It has now been discovered that a very effective soil-release and anti-soil redeposition agents finish can be applied to fabrics using a novel hydrophilic composition comprising a reaction product of:

1. 10 to 45 weight percent of an organic diisocyanate and,
2. 35 to 89 weight percent of a compound containing one or two active hydrogen atoms selected from:
   a. 75 to 100 weight percent of a compound of the general formula:

$$R-(O-C_xH_z)_n-OH$$

wherein
   R is a hydrogen or a hydrocarbon radical containing from 1 to 20 carbon atoms,
   $x$ is a number from 2 to 4;
   $n$ is a number to indicate that the molecular weight is between 300 and 10,000; and,
   b. 0 to 25 weight percent of a diol, and,
3. 1 to 25 weight percent of a nitrogen-containing compound of the general formula:

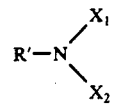

wherein
R' is an alkyl radical containing from 1 to 5 carbon atoms;
$X_1$ and $X_2$ are hydroxyalkyl or amino alkyl radicals with the proviso that the overall ratio of NCO-/active H is from about 0.7 to about 1.

It is accordingly an object of this invention to provide novel textile treating compositions for application to textile materials to impart thereto outstanding soil-release and anti-soil redeposition properties through numerous laundering and dry cleaning cycles.

It is another object of this invention to provide a process for treating textile material in such a manner that it has outstanding soil-release and anti-soil redeposition properties.

It is another object of this invention to provide outstanding soil-release and anti-soil redeposition properties to textile materials comprised of polyester fibers.

DESCRIPTION OF THE PREFERRED EMBODIMENTS

The compositions of the present invention may be used to treat a wide variety of textile materials made exclusively from synthetic polymer materials as well as blends of natural and synthetic fibers. Examples of synthetic fibers which may be successfully employed in the practice of the present invention include those made with polyamide, acrylic and polyester fibers. Blends of natural and synthetic fibers which may be successfully treated with compositions of the present invention are preferably fabrics comprised of at least 50 weight percent of polyester fibers, with other fibers, such as cotton, rayon acrylics and the like. It is preferred that the fabrics treated in accordance with the present invention be blends of polyester fibers wherein the polyester fibers comprise from about 50 to 75 percent of the total weight of the blend with about 25 to 50 percent of the blend being composed of the cellulosic fibers, such as cotton. The polyester fibers which make up at least 50 percent by weight of the fabric may be any of the conventional, linear fiber-forming polyesters which are well known to those skilled in the art.

The deposition of the products according to the invention can be effected by any means, that is to say the deposition can in particular consist of a finish applied to the raw fabric by padding or spraying after dyeing, or applied to the textile article, after washing. However, preferably the products are deposited in the course of the operations of washing the fabrics, that is to say the polyurethanes according to the invention are introduced either into the detergent compositions or into the rinsing liquor.

The products according to the invention can be incorporated into any type of anionic, non-ionic, cationic, ampholytic or zwitter-ionic detergent compositions. These compositions in general contain a certain number of conventional ingredients, in varying amount, in addition to surface-active agents and builders. Suitable ingredients are agents which assist foaming or, conversely, permit control of the foam, such as polysiloxanes, inorganic salts such as sodium sulphate, bleaching agents, perfumes, dyestuffs, fluorescent agents and enzymes as well as other anti-redeposition agents such as carboxymethyl cellulose.

It has been found that the novel hydrophilic polyurethane compositions of this invention may be applied to the fabric as aqueous dispersions containing from about 0.25 to 5 weight percent of the polyurethane polymer in the treating bath to provide at least about 0.25 weight percent of the polyurethane polymer on the fabric based upon dry weight. Preferably, it has been found that from about 1 to 3 weight percent of the polyurethane polymer on the fabric based upon the dry weight of the fabric is desired.

According to the invention, the hydrophilic polyurethane results from the reaction of:
1. 10 to 45 percent by weight of an organic diisocyanate and,
2. 35 to 89 percent by weight of a compound containing 1 or 2 active hydrogen atoms selected from:
   a. 75 to 100 percent by weight of a compound of the general formula $R-(O-C_xH_{2x})_n-OH$ in which
      R is hydrogen or a hydrocarbon radical containing from 1 to 20 carbon atoms, $x$ is a number from 2 to 4, and, $n$ is a number such that the molecular weight is between 300 and 10,000; and,
   b. 0 to 25 percent by weight of a diol; and,
3. 1 to 20 percent by weight of a nitrogen-containing compound with mobile hydrogens, of the general formula

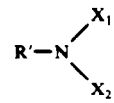

in which R' is an alkyl radical containing from 1 to 5 carbon atoms and $X_1$ and $X_2$, which may be identical or different, are hydroxyalkyl or aminoalkyl radicals, it being possible for the tertiary nitrogen to be quaternised before or after reaction with the organic diisocyanate component with the proviso that the overall ratio of NCO/active H is between 0.7 and 1.

Any well known aromatic, aliphatic or cycloaliphatic organic diisocyanates may be used for carrying out the invention. Suitable organic diisocyanates are toluylene diisocyanates, di(isocyanatophenyl)alkanes such as the di(isocyanatophenyl) alkanes such as di(isocyanatophenyl)-methane, and di(isocyanatocyclohexyl)alkanes such as di(isocyanatocyclohexyl)methane. The amount of organic diisocyanate used in the practice of this invention is from 10 to 45 percent by weight of the final polyurethane.

The polyoxyalkylene hydroxy compounds which can be used are represented by the following formula:

wherein R is hydrogen or a hydrocarbon radical containing from about 1 to about 20 carbon atoms, such as the dodecyl or nonylphenyl radicals;
   $x$ is 2, 3 or 4 and, $n$ is a number such that the molecular weight is between 300 and 10,000.

Preferably, the compound is a polyoxyalkylene glycol of molecular weight between 300 and 4,000. Particularly preferred in the compositions of the preferred invention is polyethylene glycol having a molecular weight of about 1,500 although this preference is primarily of the ready availability and convenience of processing of the particular material. Polyglycols containing other alkylene groups can also be utilized such as polypropylene glycols and the like.

The diol compound (b) is preferably of a molecular weight less than 300. Saturated diols such as the alkanediols or alkylene glycols such as ethylene glycol, the propylene glycols, the butylene glycols, diethylene glycol, triethylene glycol and tetraethylene glycol are suitable.

The nitrogen-containing compound C represented by the formula:

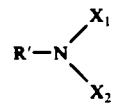

wherein
   R' is an alkyl radical containing from about 1 to about 5 carbon atoms; and,
   $X_1$ and $X_2$, which may be identical or different, are hydroxyalkyl or aminoalkyl radicals which preferably contain from about 1 to about 5 carbon atoms.

EXAMPLE 7

Example 1 is repeated without, however, carrying out the quaternisation of the polyurethane. A product 7 is obtained. The cloud point of a 1% strength solution in acetic acid of pH 4 is 73° C.

EXAMPLE 8

The following mixture is reacted under conditions identical to those of Example 1:

| | | |
|---|---|---|
| 1) | toluylene diisocyanate | 30.9% |
| 2) | mixture consisting of: | 65.3% |
| | a) 80.5% of polyoxyethylene glycol of molecular weight 4,000 | |
| | b) 19.5% of ethylene glycol | |
| 3) | N-methyldiethanolamine | 3.8% |

The product is quaternised with 4.0 parts of dimethyl sulphate. The cloud point of a 1% strength solution of the product 8, thus obtained, is 60° C.

EXAMPLE 9

The following mixture is reacted under conditions identical to those of Example 1:

| | | |
|---|---|---|
| 1) | toluylene diisocyanate | 33% |
| 2) | mixture consisting of: | 62.8% |
| | a) 55.6% of polyoxyethylene glycol of molecular weight 1,500 32% of nonylphenol containing 30 mols of ethylene oxide | |
| | b) 12.4% of ethylene glycol | |
| 3) | N-methyldiethanolamine | 4.2% |

The product is quaternised with 4.45 parts of dimethyl sulphate. The cloud point of a 1% strength solution of the product 9, thus obtained, is 62° C.

EXAMPLE 10

The constituents of the mixture described in Example 1 are reacted in the following sequence: the polyoxyethylene glycol, the ethylene glycol and the N-methyldiethanolamine are introduced into a reactor and are heated to 70° C. The dimethyl sulphate is then added and is allowed to react for 1 hour. The toluylene diisocyanate is then introduced over the course of two hours while maintaining the temperature at between 130 and 135° C. Water is then added at 130°-135° C, while stirring.

The cloud point of the product 10 thus obtained, is 67° C.

EXAMPLE 11

The following mixture is reacted under conditions identical to those of Example 1:

| | | |
|---|---|---|
| 1) | toluylene diisocyanate | 20.6% |
| 2) | mixture consisting of: | 79.4% |
| | a) 94.7% of polyoxyethylene glycol of molecular weight 1,500 | |
| | b) 5.3% of ethylene glycol | |
| 3) | N-methyldiethanolamine | 0% |

The product 11 is not a product according to the invention because it does not contain compound C. The cloud point of a 1% strength solution is 31° C.

EXAMPLE 12

The following mixture is reacted under conditions identical to those of Example 1:

| | | |
|---|---|---|
| 1) | toluylene diisocyanate | 33.03% |
| 2) | mixture consisting of: | 62.78% |
| | a) 88.64% of polyoxyethylene glycol of molecular weight 1,500 | |
| | b) 11.38% of ethylene glycol | |
| 3) | N-methyldiethanolamine | 4.18% |

The tertiary nitrogen of the product obtained is quaternised with 4.45 parts of benzyl chloride.

EXAMPLE 13

The preparation is identical to that of Example 12, but the tertiary nitrogen of the product obtained is quaternised with 8.75 parts of lauryl bromide.

EXAMPLE 14

The following mixture is reacted under conditions identical to those of Example 1:

| | | |
|---|---|---|
| 1) | toluylene diisocyanate | 33.00% |
| 2) | mixture consisting of: | 62.82% |
| | a) 37.20% of polyoxyethylene glycol of molecular weight 1,500 15.50% of ethoxylated nonylphenol containing 30 mols of ethylene oxide. | |
| | b) 11.64% of ethylene glycol | |
| 3) | N-methyldiethanolamine | 4.18% |

The tertiary nitrogen of the product obtained is quaternised with 4.42 parts of dimethylsulfate.

EXAMPLE 15

The mixture of Example 1 is reacted but with various proportions of ethylene glycol to obtain products having respectively following hydroxyl number:

| | | |
|---|---|---|
| a) | 11.2 mg | KOH/g |
| b) | 17.5 mg | KOH/g |
| c) | 27.6 mg | KOH/g |
| d) | 38.3 mg | KOH/g |

In the example which follows, the properties, as antiredeposition agents, of the products according to the invention are demonstrated.

EXAMPLE 16

Squares (12 × 12 cm) of polyester-cotton fabric (67/33) are washed in a Lini-Test (ORIGINAL HANAU) apparatus for 20 minutes at 60° C in hard water (33° of hardness) containing 0.75 g/l of the following conventional detergent composition:

| | |
|---|---|
| Linear alkylbenzenesulphonate (alkyl containing about 12 carbon atoms) | 8% |
| Alcohol containing 16 to 18 carbon atoms and carrying about 50 ethylene oxide units | 3% |
| Natural tallow soap | 4% |
| Sodium tripolyphosphate | 30% |
| Sodium orthophosphate | 1.5% |
| Sodium pyrophosphate | 12.5% |
| Sodium perborate | 25% |
| Sodium sulphate | 10% |
| Sodium disilicate | 6% |

Illustrative nitrogen-containing compounds are the N-alkyldiethanolamines or the N-alkyldipropanolamines, the N-alkylimino-bis-propylamines, the N-alkylaminopropyl-ethanolamines or N-alkylaminopropyl-propanolamines, with the alkyl radical from about 1 to about 5 carbon atoms. The nitrogen-containing compound C represents 1 to 20 percent by weight of the final polyurethane.

In a further embodiment of this invention, the tertiary nitrogen of the nitrogen-containing compound can be quaternized. This quaternisation reaction can be carried out either before the reaction of the diisocyanate with a compound containing one or two active hydrogen atoms, or after formation of the polyurethane. In each situation it is carried out with conventional quaternising agents such as methyl sulphate, methyl chloride or benzyl chloride.

The overall ratio of the NCO group of the diisocyanate compound to the combined total of active hydrogens of the other components of the present composition must be from about 0.7 to about 1. Preferably, the ratio should be greater than or equal to 0.7 and less than 1. Thus, the reaction always takes place in the presence of an excess of active hydrogen atoms.

The conditions of the reaction of the diisocyanate component with the compounds containing active hydrogen atoms are those of the conventional polyurethane formation reaction. The reaction can take place in the presence or absence of a nonhydroxylic solvent which is preferably water-miscible, such as acetone, methyl ethyl ketone and dimethylformamide.

According to the invention, a suitable method is to introduce the diisocyanate into a mixture of all the compounds with active hydrogen atoms and to regulate this introduction so as to maintain the temperature at between 20 and 150° C.

The examples which follow describe some of the novel polyurethane compositions according to the invention. All the percentages and parts indicated are by weight.

EXAMPLE 1

100 parts of the following mixture are reacted in a reactor containing 50 parts of acetone:

| | | |
|---|---|---|
| 1) | toluylene diisocyanate (a commercial mixture of the 2,4- and 2,6-isomers in an 80–20 ratio) | 33% |
| 2) | a mixture consisting of: | 62.8% |
| | a) 88.5% of a polyoxyethylene glycol of molecular weight 1,500 | |
| | b) 11.5% of ethylene glycol | |
| 3) | N-methyldiethanolamine | 4.2% | the diisocyanate is introduced over the course of about one hour into the mixture of 2 and 3, the temperature is maintained at between 30° and 40° C, and the reaction being continued for 2 additional hours until the free NCO groups have disappeared. 4.4 parts by weight of dimethyl sulphate are then added to quaternise N-methyldiethanolamine. After 2 hours reaction time, 250 parts of water are added to the reaction mixture and then acetone is driven off by evaporation in vacuo. This gives a limpid aqueous solution. A 1% strength solution of the product in water turns cloudy at 69° C.

EXAMPLE 2

The following mixture is reacted under conditions identical to those of Example 1:

| | | |
|---|---|---|
| 1) | toluylene diisocyanate | 32.5% |
| 2) | mixture consisting of: | 59.3% |
| | a) 92% of polyoxyethylene glycol of molecular weight 1,500 | |
| | b) 8% of ethylene glycol | |
| 3) | N-methyldiethanolamine | 8.2% |

The product is quaternised with 8.7 parts of dimethyl sulphate.

The cloud point of a 1% strength solution of the product 2, thus obtained, is 67° C.

EXAMPLE 3

The following mixture is reacted under conditions identical to those of Example 1:

| | | |
|---|---|---|
| 1) | toluylene diisocyanate | 35.8% |
| 2) | polyoxyethylene glycol of molecular weight 300 | 59.7% |
| 3) | N-methyldiethanolamine | 4.5% |

The product is quaternised with 4.8 parts of dimethyl sulphate.

The cloud point of a 1% strength solution of the product 3, thus obtained, is 20° C.

EXAMPLE 4

The following mixture is reacted under conditions identical to those of Example 1:

| | | |
|---|---|---|
| 1) | toluylene diisocyanate | 33.7% |
| 2) | mixture consisting of: | 62% |
| | a) 90.7% of polyoxyethylene glycol of molecular weight 600 | |
| | b) 9.3% of ethylene glycol | |
| 3) | N-methyldiethanolamine | 4.3% |

The product is quaternised with 4.45 parts of dimethyl sulphate.

The cloud point of a 1% strength solution of the product 4, thus obtained, is 52°–53° C.

EXAMPLE 5

The following mixture is reacted under conditions identical to those of Example 1:

| | | |
|---|---|---|
| 1) | di-(4-isocyanatophenyl)-methane | 18.9% |
| 2) | polyoxyethylene glycol of molecular weight 1,500 | 75.7% |
| 3) | N-methyldiethanolamine | 5.4% |

The product is quaternised with 5.7 parts of dimethyl sulphate.

The cloud point of a 1% strength solution of the product 5, thus obtained, is above 100° C.

EXAMPLE 6

The following mixture is reacted under conditions identical to those of Example 1, without quaternisation:

| | | |
|---|---|---|
| 1) | toluylene diisocyanate | 15% |
| 2) | polyoxyethylene glycol of molecular weight 1,500 | 82.19 |
| 3) | N-methyldiethanolamine | 2.9% |

The cloud point of a 1% strength solution of the product 6, thus obtained, is 85° C.

A Spangler soiling agent (see J. Am. Oil Chem. Soc. 1965, 42, 723-727) is introduced into each washing vessel at the rate of 5% relative to the weight of the washing solution. The product according to the invention is tested at the rate of 3% by weight relative to the detergent composition in which it is incorporated.

The redeposition of the Spangler stain on the fabric is assessed by the difference in reflectance $\Delta R$ relative to a comparison sample washed without addition of a product according to the invention. The reflectance is measured on a Gardner apparatus (GARDNER INSTRUMENTS).

The results obtained with a certain number of products described above are shown in the Table I below:

TABLE I

| Product tested | 1 | 2 | 3 | 4 | 7 |
|---|---|---|---|---|---|
| $\Delta R$ | +12 | +8 | +6 | +11 | +8 |

The confidence range under the test conditions is 1.

The example which follows demonstrates the properties as an anti-soiling agent of the products according to the invention used in an anionic wash liquor.

EXAMPLE 17

Two strips (20 × 115 cm) of polyester/cotton fabric (67/33) of reflectance C are washed in a Miele 421S automatic machine (programmed for colored fabrics — 60° C) in the presence of 5 g/l of the following conventional detergent composition:

| | |
|---|---|
| Linear alkylbenzenesulphonate (alkyl containing about 12 carbon atoms) | 9.9% |
| Alcohol containing 16 to 18 carbon atoms and carrying about 15 ethylene oxide units | 5% |
| Natural tallow soap | 6.6% |
| Sodium tripolyphosphate | 34% |
| Sodium orthophosphate | 0.9% |
| Sodium pyrophosphate | 2.3% |
| Sodium perborate | 22.9% |
| Sodium sulphate | 4.8% |
| Sodium disilicate | 5.4% |
| Carboxymethylcellulose | 0.6% |
| Water | 7.6% |

The product tested is introduced at the rate of 3% by weight relative to the detergent composition in which it is incorporated. Strips of fabric are then dried at ambient temperature and cut into squares (12 × 12 cm) on which are deposited spent engine oil, Spangler dirt, tomato concentrate and lipstick, using 6 squares per type of stain. The stains are then aged by being left for one hour in an oven at 60° C. Their reflectance R is measured on an Elrepho apparatus with an FMY/C filter for the spent engine oil and the Spangler dirt and an FMX/C filter for the tomato concentrate and the lipstick.

The stained squares are then basted onto ten clean pieces of cotton, after which they are washed as above, and dried. Their reflectance $R_1$ is then measured. The efficacy of the product tested, as an anti-soiling agent, is assessed in terms of the percentage removal of the stains, calculated from the equation:

$$E \text{ in \%} = \frac{R_1 - R}{C - R} \times 100$$

For each product tested, the mean percentage removal of the various stains is calculated. The results of these tests are shown in the Table II below:

TABLE II

| Product Tested | comparison sample | 1 | 2 | 3 | 4 | 5 | 7 | 11 | 12 | 13 | 14 | 15a | 15b | 15c | 15d |
|---|---|---|---|---|---|---|---|---|---|---|---|---|---|---|---|
| E in % | 40 | 58 | 55 | 46 | 48 | 47 | 50 | 40 | 50 | 47 | 50 | 58 | 56 | 52 | 46 |

The confidence range under the test conditions is 1.

In the example which follows, the properties as an anti-soiling agent of the products according to the invention used in a non-ionic wash liquor are demonstrated.

EXAMPLE 18

The experiments are carried out under conditions identical to those described in Example 13, but with the following non-ionic detergent composition:

| | |
|---|---|
| Alcohol containing 10 to 12 carbon atoms and carrying an average of 5 ethylene oxide units | 9.4% |
| Sodium tripolyphosphate | 31.4% |
| Sodium orthophosphate | 1.1% |
| Sodium pyrophosphate | 7.3% |
| Sodium perborate | 26.2% |
| Sodium sulphate | 15.8% |
| Sodium disilicate | 8.5% |
| Polysiloxane (anti-foaming agent) | 0.3% |

The results of these tests are shown in the Table III below:

TABLE III

| Product Tested | Comparison Sample | 1 | 2 | 4 | 7 | 11 |
|---|---|---|---|---|---|---|
| E in % | 56 | 68 | 62 | 65 | 73 | 56 |

In the example which follows, the properties as an anti-soiling agent of the products according to the invention when they are introduced in the course of the last rinse of a laundering operation are demonstrated.

EXAMPLE 19

Two strips (20 × 115 cm) of polyester/cotton fabric (67/33) of reflectance C are washed in a Miele 421S automatic machine (programmed for colored fabrics) in the presence of 5 g/l of the following detergent composition:

| | |
|---|---|
| Linear alkylbenzenesulphonate | 9.9% |
| Alcohol containing 16 to 18 carbon atoms and carrying about 15 ethylene oxide units | 5% |
| Natural tallow soap | 6.6% |
| Sodium tripolyphosphate | 34% |
| Sodium orthophosphate | 0.9% |
| Sodium pyrosphosphate | 2.3% |
| Sodium perborate | 22.9% |
| Sodium sulphate | 4.8% |
| Sodium disilicate | 5.4% |
| Carboxymethylcellulose | 0.6% |

| | |
|---|---|
| Water | 7.6% |

3 g of the product tested are introduced in the course of the last rinse of the laundering operation. The strips of fabric are then dried at ambient temperature and cut into squares (12 × 12 cm) on which are deposited spent engine oil, Spangler dirt, tomato concentrate and lipstick, using 6 squares per type of stain. The stains are then aged by being left for one hour in an oven at 60° C. Their reflectance R is measured on an Elrepho apparatus with an FMY/C filter for the spent engine oil and the Spangler dirt and an FMX/C filter for the tomato concentrate and the lipstick.

The stained squares are then basted onto ten clean pieces of cotton, after which they are washed in the presence of a concentration of 5 g/l of the detergent composition described above. After drying, the reflectance $R_1$ of the squares is measured. The efficacy of the product tested, as an anti-soiling agent, is assessed in terms of the percentage removal of the stains, calculated from the equation:

$$E \text{ in } \% = \frac{R_1 - R}{C - R} \times 100$$

The mean percentage removal of the various stains is then calculated. The results of these tests are shown in the following Table IV.

TABLE IV

| Product Tested | Comparison Sample | 1 |
|---|---|---|
| E in % | 40 | 61 |

The significant deviation in this test is 1%.

In the example which follows, the properties as an anti-soiling agent of the products according to the invention when deposited by padding on the fabric are demonstrated.

EXAMPLE 20

Two strips (20 × 115 cm) of polyester/cotton fabric (67/33) of reflectance C are dipped in a 2% strength aqueous solution of the product tested. After 15 minutes' impregnation the two strips are padded (liquor pick-up 100%) and are left to dry at ambient temperature.

The strips impregnated in this way are cut into squares (12 × 12 cm). On these fabric squares are deposited spent engine oil, Spangler dirt, tomato concentrate and lipstick, using six squares per type of stain. The stains are then aged by being left for 1 hour in an oven at 60° C. Their reflectance R is measured on an Elrepho apparatus with an FMY/C filter for the spent engine oil and the Spangler dirt and an FMX/C filter for the tomato concentrate and the lipstick.

The stained squares are then basted onto ten clean pieces of cotton, after which they are washed in a Miele 421S automatic machine (programmed for colored fabrics) in the presence of 5 g/l of the following conventional detergent:

| | |
|---|---|
| Linear alkylbenzenesulphonate (alkyl containing 12 carbon atoms) | 9.9% |
| Alcohol containing 16 to 18 carbon atoms and carrying about 15 ethylene oxide units | 5% |
| Natural tallow soap | 6.6% |
| Sodium tripolyphosphate | 34% |
| Sodium orthophosphate | 0.9% |
| Sodium pyrophosphate | 2.3% |
| Sodium perborate | 22.9% |
| Sodium sulphate | 4.8% |
| Sodium disilicate | 5.4% |
| Carboxymethylcellulose | 0.6% |
| Water | 7.6% |

After washing and drying at ambient temperature, the reflectance $R_1$ of the fabric squares is measured. The efficacy of the product tested as an anti-soiling finish is assessed in terms of the percentage removal of the stains. This percentage is calculated in the following manner:

$$E \text{ in } \% = \frac{R_1 - R}{C - R} \times 100$$

For each product tested, the means percentage removal of the various stains is calculated. The results of these tests are shown in the Table V below:

TABLE V

| Product Tested | Comparison Sample | 7 | 11 |
|---|---|---|---|
| E in % | 37 | 60 | 45 |

What is claimed is:

1. A hydrophilic polyurethane selected from the group consisting of a polyurethane reaction product resulting from the simultaneous reaction among:
   1. 10 to 45% by weight of an organic diisocyanate (A),
   2. 35 to 89% by weight of a mixture (B) containing: 75 to 100% by weight of a compound ($B_1$) having the formula

   $$R - C_2H_4)_n - OH \qquad (I)$$

wherein R is hydrogen or a hydrocarbon radical containing 1 to 20 carbon atoms and n is a number to indicate that the molecular weight is between 300 and 10,000, and 0 to 25% by weight of a diol ($B_2$), and
   3. 1 to 20% by weight of a nitrogen-containing compound (C) having the formula

   (II)

wherein
   $R_1$ is an alkyl radical containing 1 to 5 carbon atoms,
   $X_1$ and $X_2$ are hydroxyalkyl or aminoalkyl radicals, with the proviso that the overall ratio of NCO/active hydrogen is from about 0.7 to about 1;
   and quaternary ammonium salts thereof.

2. The quaternary salt of a polyurethane reaction product as defined in claim 1, which is obtained by quaternizing said polyurethane reaction product.

3. The quaternary salt of a polyurethane reaction product as defined in claim 1, which is obtained by quaternizing the tertiary nitrogen atom within the compound of formula (II) prior to the polymerization.

4. The polyurethane as defined in claim 1, wherein $n$ is a number indicating a molecular between about 300 and about 4,000.

5. The polyurethane as defined in claim 1, in which the organic diisocyanate (A) is selected from the group consisting of a toluylene diisocyanate, a di(isocyanatophenyl)methane or a di(isocyanatocyclohexyl)methane.

6. The polyurethane as defined in claim 1, in which the compound ($B_2$) is a diol of a molecular weight of less than 300.

7. The polyurethane as defined in claim 1, in which the compound ($B_1$) is selected from the group consisting of ethylene glycol, a propylene glycol, a butylene glycol, diethylene glycol, triethylene glycol and tetraethylene glycol.

8. The polyurethane as defined in claim 1, in which the radicals $X_1$ and $X_2$ of the nitrogen containing compound (C) contains less than 5 carbon atoms.

9. The polyurethane as defined in claim 1, in which the compound (C) is a N-alkyldiethanolamine, a N-alkyldipropanolamine, a N-alkylamino-bis-propylamine, a N-alkylaminopropylethanolamine or a N-alkylaminopropylpropanolamine, in which the alkyl radical contains 1 to 5 carbon atoms.

10. The polyurethane as defined in claim 1, wherein the diisocyanate (A) is selected from the group consisting of a toluylene diisocyanate, a di(isocyanatophenyl)methane and a di(isocyanatocyclohexyl)methane, the compound ($B_1$) is a polyethylene glycol having a molecular weight between 300 and 4,000, the diol ($B_2$) is selected from the group consisting of ethylene glycol, a propylene glycol, a butylene glycol, diethylene glycol, triethylene glycol and tetraethylene glycol, and, the compound (C) is selected from the group consisting of a N-alkyldiethanolamine, a N-alkyldipropanolamine, a N-alkylaminopropylethanolamine and a N-alkylaminopropyl-propanoamine, in which the alkyl radical contains less than 5 carbon atoms.

11. A process for treating textile material which comprises applying thereto a liquid composition containing a polyurethane as defined in claim 1, in amounts sufficient to impart soil-release and anti-soil redeposition characteristics to said textile material.

12. The process as defined in claim 11, wherein the amount of the polyurethane applied to the textile material is equivalent to 1 to 3% by weight of polyurethane relative to the dry weight of the textile material.

13. The process as defined in claim 11, wherein the polyurethane-containing composition is applied in admixture with a detergent composition during the washing of said textile material.

14. The process as defined in claim 11, wherein said polyurethane composition is applied during the course of the rinse carried out at the end of the washing operations of said textile material.

15. A liquid composition for treating textile materials comprising water and a polyurethane as defined in claim 1, in an amount sufficient to impart anti-soil redeposition and soil-releasing characteristics when applied to the treated textile material.

16. A liquid composition for treating textile materials comprising water and a polyurethane as defined in claim 10, in an amount sufficient to impart anti-soil redeposition and soil-releasing characteristics when applied to the treated textile material.

17. The liquid composition as defined in claim 15, comprising 0.25 to 5% by weight of the polyurethane.

18. A detergent composition comprising a surface active agent and a polyurethane as defined in claim 1, in an amount sufficient to impart anti-soil redeposition and soil-release characteristics when applied to a textile material during a washing process.

19. A detergent composition comprising a surface active agent and a polyurethane as defined in claim 10, in an amount sufficient to impart anti-soil redeposition and soil-release characteristics when applied to a textile material during a washing process.

20. The detergent composition as defined in claim 18, containing about 3% by weight of the polyurethane.

21. The detergent composition as defined in claim 18, containing about 9.4 to about 23.5% by weight of a surface active agent.

22. An article of manufacture which comprises a textile material having deposited thereon an amount of a polyurethane as defined in claim 1, which is at least about 0.25% by weight of the dry material and is sufficient to impart anti-soil redeposition and soil-release characteristics to said material.

23. The article as defined in claim 22, wherein the amount of polyurethane is from about 1 to about 3% of the dry material.

* * * * *

UNITED STATES PATENT OFFICE
CERTIFICATE OF CORRECTION

Patent No. 4,068,035  Dated January 10, 1978

Inventor(s) Robert Violland, Alain Lagasse, Bernard Papillon, Jean Neel, and Maurice Coudurier It is certified that error appears in the above-identified patent and that said Letters Patent are hereby corrected as shown below:

In the Abstract of the Disclosure, line 10, "$R-(-OC_xH_x)_n-OH$" should read -- $R-(-OC_xH_{2x})_n-OH$ --.

In column 2, line 33, "$R-(-O-C_xH_x)_n-OH$" should read -- $R-(-OC_xH_{2x})_n-OH$ --.

In column 6, line 64, "82.19" should read -- 82.1% --.

In Claim 1, line 9, "$R-C_2H_4)_n-OH$" should read -- $R-(-OC_2H_4)_n-OH$ --.

In Claim 4, line 2, "molecular between" should read -- molecular weight between --.

In Claim 7, line 2, "$B_1$" should read -- $B_2$ --.

In Claim 10, line 13, "N-alkylaminopropyl-propanoamine" should read -- N-alkylaminopropyl-propanolamine --.

In column 8, line 9, "11.38%" should read -- 11.36% --.

Signed and Sealed this

Eighth Day of August 1978

[SEAL]

Attest:

RUTH C. MASON
Attesting Officer

DONALD W. BANNER
Commissioner of Patents and Trademarks